United States Patent [19]

Deeks

[11] 4,044,690
[45] Aug. 30, 1977

[54] RAILWAY TANK HOPPER CAR

[76] Inventor: Ronald George Deeks, 1521 Warland Road, Oakville, Ontario, Canada

[21] Appl. No.: 561,143

[22] Filed: Mar. 24, 1975

[51] Int. Cl.[2] .......................... B61D 5/00; B61D 5/06; B61D 5/08; B61D 7/00
[52] U.S. Cl. .................... 105/247; 105/358; 105/360; 105/406 R; 222/195
[58] Field of Search .............. 105/247, 248, 249, 250, 105/251, 252, 253, 254, 358, 360, 406 R; 222/195; 302/52, 53, 57

[56] References Cited

U.S. PATENT DOCUMENTS

| | | | |
|---|---|---|---|
| 1,630,001 | 5/1927 | Gardner | 105/406 R |
| 2,011,076 | 8/1935 | Prescott | 105/360 X |
| 2,915,338 | 12/1959 | Loomis | 302/53 |
| 2,946,296 | 7/1960 | Jones | 105/253 |
| 3,469,888 | 9/1969 | Aller et al. | 302/52 |
| 3,479,724 | 11/1969 | Kruizenga et al. | 105/358 X |
| 3,631,815 | 1/1972 | Heap | 105/358 |
| 3,713,399 | 1/1973 | Bembridge et al. | 105/358 |
| 3,883,148 | 5/1975 | Miller | 105/358 |

Primary Examiner—Robert J. Spar
Assistant Examiner—Howard Beltran

[57] ABSTRACT

A railroad tank car for use in handling dry bulk commodities. The car body structure includes a pair of V shaped hopper sections sloping downwardly from each end of the car. The hopper sections having side walls which increase in length as they extend towards the center of the car. A pair of asymmetric truncated cone sections are secured adjacent to the corresponding upper edges of the hopper sections. End sections are secured adjacent the outer edges of the hopper section and the cone section. First stiffener members are secured to the outer surfaces of the hopper section. Longitudinally extending second stiffener members are secured to the first stiffener members adjacent the intersection between the hopper sections and the cone sections. Tie members extend transversely across the hopper sections. A plurality of longitudinally extending aeration conveyor trays are supported from the hopper sections defining a plenum area therebelow. Air supply means are provided to direct pressurized air into the plenum area.

8 Claims, 13 Drawing Figures

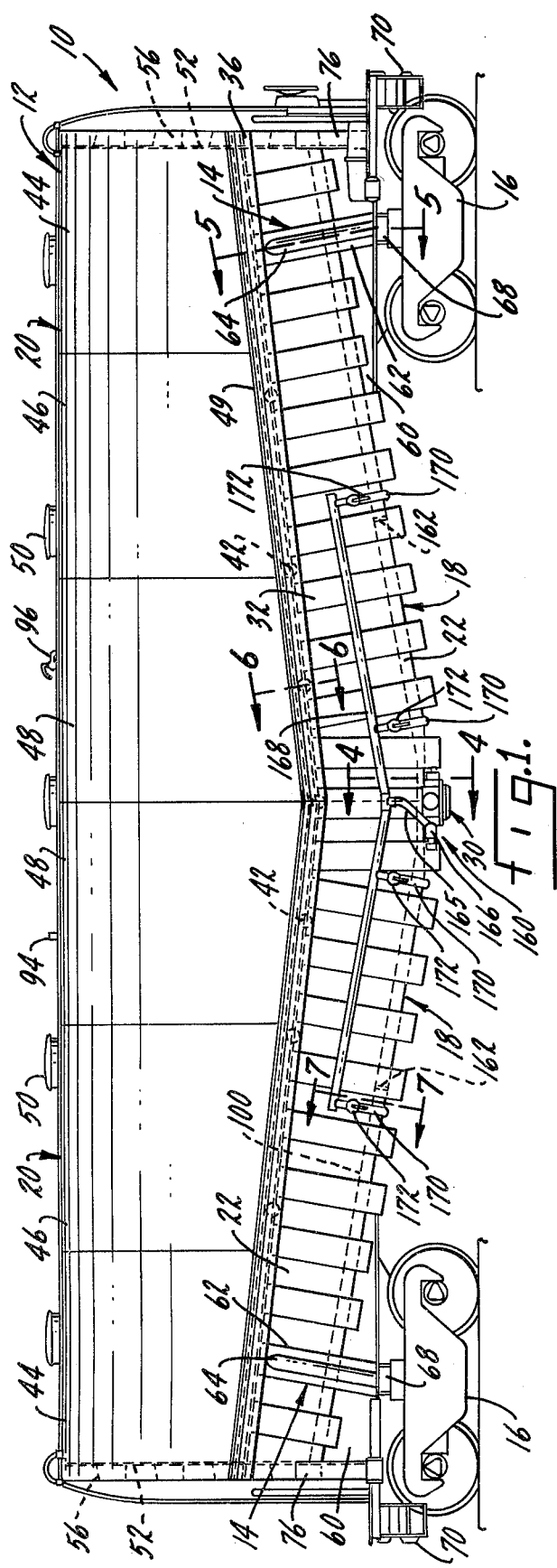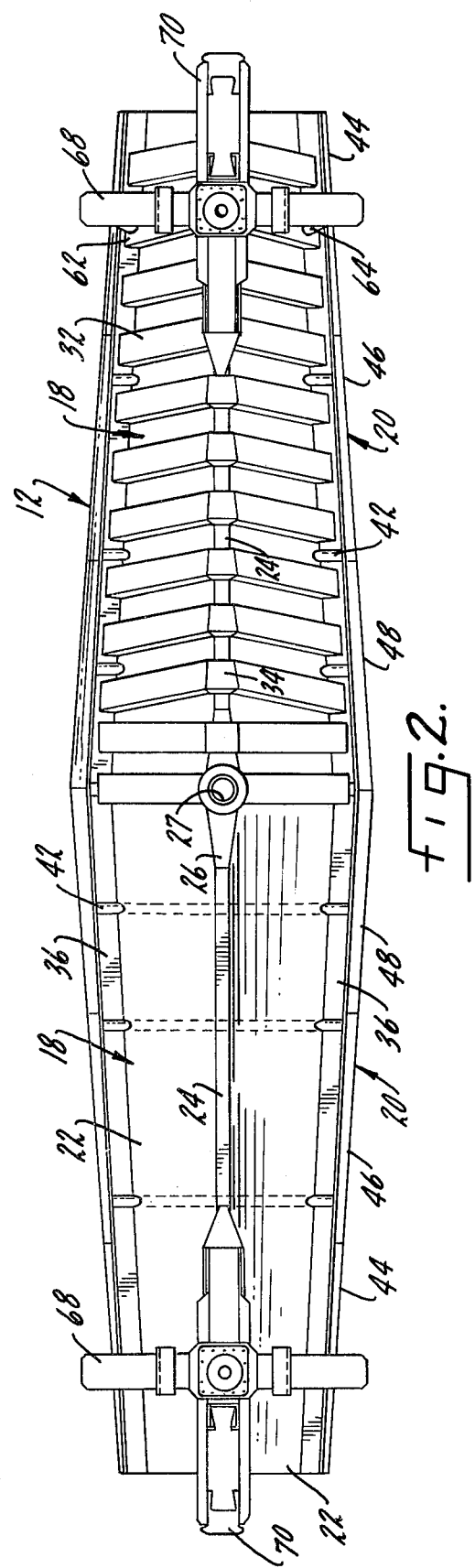

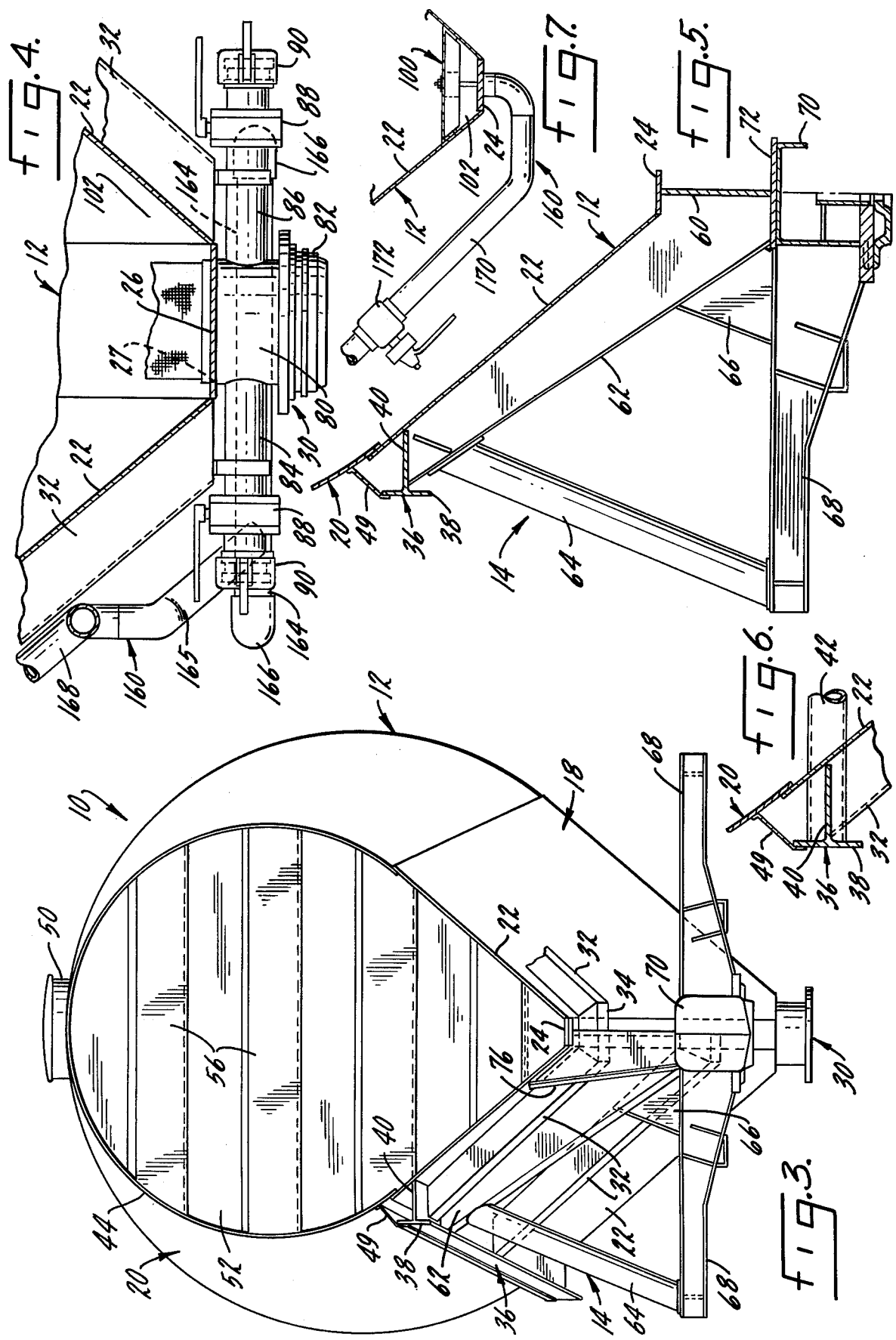

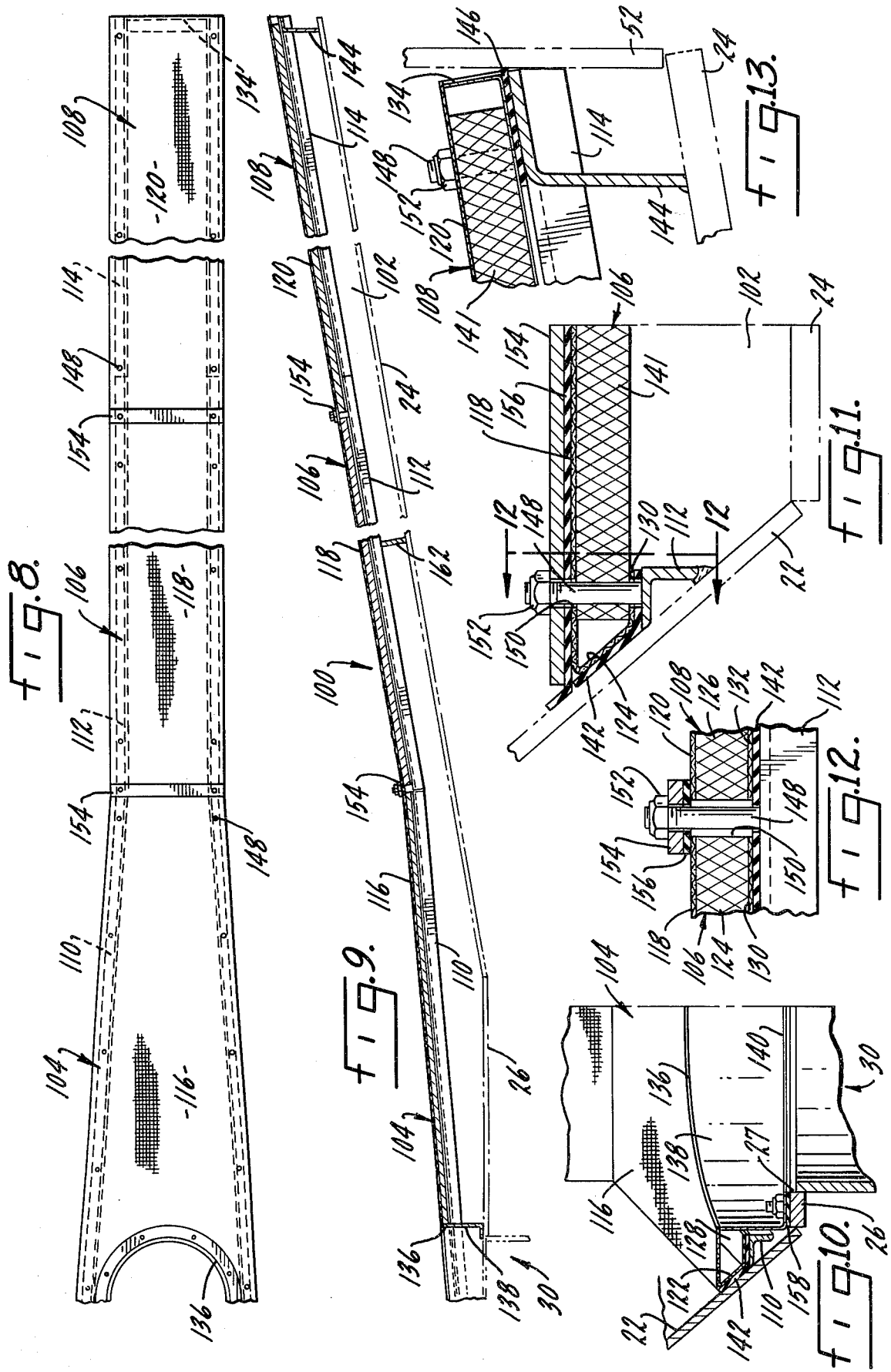

RAILWAY TANK HOPPER CAR

BACKGROUND OF THE INVENTION

The present invention is directed to a railroad tank car specifically designed to permit the dual functions of pressure and gravity discharge of dry bulk commodities.

It has heretofore been proposed to construct a railroad tank car of a cylindrical cross-section with a fall from the ends to a central bottom outlet. Aeration of the product was accomplished by lining the bottom half of the car with a series of canvas hoses strapped to the bottom. The car was somewhat of a plumber's nightmare and was very expensive to manufacture. In addition, it was vertually impossible to clean the car with any degree of economy, and maintenance presented an horrendous problem. Due to the difficulty in maintaining cleanliness, the car was obviously unsuitable for food service. The one advantage that such a car possessed was it could be operated as either a pressure differential car or could be unloaded by gravity by merely fluidizing the layer of material in contact with the aeration system.

It is quite obvious that in designing the above car the main object was to simplify the structural problem of retaining pressure in the car body and then to equip the car with aeration devices and controls to suit this geometric configuration. By simplifying the structural approach, the car had become much more complex and expensive. In contrast, in designing the car of the present invention the geometry of the car was specifically designed to fit the requirements of the aeration devices and controls. This resulted in the car body geometry being completely defined prior to the start of the structural design.

In conceiving the design of the present invention the starting point was the provision of two inclined fluidized bed conveyors on either side of the outlet with a 10 degree slope. To ensure that any material above the conveyors would fall on to the conveyors it was necessary to provide steeply sloping sides. To retain pressure within the car body the top ends of these side sloping surfaces were closed using a segment of a circle. If the top of the car body was to remain horizontal the car body would have to be larger in diameter at the middle than at the ends, thus, the curved part of the car body was formed as an asymmetric truncated cone. This configuration had the distinct advantage that the conveyors would be relatively narrow and therefore could be installed in segments which, for cleaning purposes, could be removed through the manways in the top of the car body. Upon removal of the aeration devices, the inside of the car body could be completely cleaned. Further, by keeping the area of the aeration devices down, the cost was kept controllable since the cost of the porous metal used in the conveyors is very high. With the basic geometrical body shape determined, it was then necessary to structurally design the car to withstand train loads in a practical and economic manner.

SUMMARY OF THE INVENTION

It is a primary object of the present invention to provide a tank car structure specifically designed to accommodate aeration apparatus which alternatively permits pressure and gravity discharge of dry bulk commodities.

Another object of the invention is to provide such a tank car structure which permits the easy removal of the aeration apparatus to facilitate its cleaning and permit its use for the transportation of food products.

A further object is to provide such a tank car structure which is designed to reduce the area of the aeration devices and thereby keep the weight and cost of the car competitive.

These and other objects are realized in accordance with the present invention by providing two fluidized conveyors sloping from each end of the car, down to a central outlet. A fluidized conveyor is a porous surface under which air is introduced which fluidizes the bulk material above the porous surface. Thus, the bulk material no longer has a natural angle of repose and instead behaves as a fluid. Since the conveyors slope towards the middle of the car, the product runs down the slope and out of the outlet. In cross section, the car body has steeply sloping sides to ensure that, as the product runs down the slope and out of the outlet, the product above the layer fluidized continues to fall onto the conveyors, becomes fluidized and flows out of the car until eventually the car is empty. The upper extremities of the sloping sides then join a circular cross section to enclose the cross sectional shape since the circle is, of course, the ideal geometry for internal pressure. This results in the upper part of the car body being two asymmetrical cones with two V-shaped troughs or hoppers under the cones.

In structural action, the car body is a hybrid: part shell and part plate structure. The conical shell segments forming the upper part of the car body serve as an economical means of resisting the interior pressures and providing strength for gravity and train loads. The unique cross-sectional shape (resulting from the need for steep hopper sides and a relatively narrow fluidized bed conveyor) made it impossible to carry pressure loads by shell action in the lower part of the car body. This problem is solved by utilizing the V-shaped troughs or hoppers which are continuously stiffened around their three sides. The out-of-balance forces which result at the junction between the shell and plate structure are resisted by interior ties coupled with continuous longitudinal stiffening. The structural action of this design is effective to isolate the shell action from the plate action for the optimum overall economy.

The geometry of the car body also necessitated a fresh approach towards the bolster/shear plate/draft sill assembly. The bottom of the car body at the wheel trucks is considerably above the draft sill. This, together with the complexity of the car body geometry, led to the use of a single vertical shear plate to transmit longitudinal train loads into the tank, and an M-shaped saddle assembly connected to a conventional bolster beam to transmit the vertical and lateral forces from the car body to the truck or jacking points.

BRIEF DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which:

FIG. 1 is an elevational view of the tank car constructed in accordance with the present invention;

FIG. 2 is a bottom plan view of the tank car body structure shown in FIG. 1 with portions removed to show structural details;

FIG. 3 is an end view of the tank car body structure shown in FIG. 1 with portions removed to show structural details;

FIG. 4 is a sectional view taken along line 4—4 in FIG. 1 with the aeration equipment removed;

FIG. 5 is a sectional view taken along line 5—5 in FIG. 1 with the aeration equipment removed;

FIG. 6 is a sectional view taken along line 6—6 in FIG. 1;

FIG. 7 is a sectional view taken along line 7—7 in FIG. 1;

FIG. 8 is a top plan view of a portion of the fluidized conveyor constructed in accordance with the present invention;

FIG. 9 is an elevational view of the conveyor portion shown in FIG. 8;

FIG. 10 is a transverse sectional view showing the support of the portion of the conveyor which is adjacent the outlet opening;

FIG. 11 is a transverse sectional view showing the support of a central portion of the conveyor;

FIG. 12 is a sectional view taken along line 12—12 in FIG. 11; and

FIG. 13 is a longitudinal sectional view showing the support of the end portion of the conveyor.

DESCRIPTION OF A PREFERRED EMBODIMENT

Referring to FIG. 1, a railway tank car constructed in accordance with the present invention is generally indicated at 10. Car 10 comprises an elongated car body portion 12 supported at its oppositely disposed ends through a bolster/shear plate/draft sill assembly 14 by wheel trucks 16 of generally conventional construction.

The geometric shape and structural design of the body portion 12 form an important part of the invention. Referring to FIGS. 1-3, body 12 is of hybrid construction having a lower portion formed from a pair of V-shaped hopper or trough sections 18 which slope downward at a ten degree angle from each end of the car to meet at the center of the car and a pair of asymmetric truncated cone sections 20 secured to the upper edges of each hopper section 18. The hopper sections 18 are formed from side wall members 22 which increase in length as they extend towards the center of the car. The cone sections 20 are formed to have an increasing diameter as they extend from their outer ends toward the center of the car so as to permit the car top to remain horizontal.

The hopper sections 18 are formed from side wall members 22 which are formed from a plurality of steel plates extending downward toward each other. The lower edges of the side walls 22 are secured to each other by bottom end closure plates 24 and a center transition plate 26, as best seen in FIG. 2. Transition plate 26 has an opening 27 for receipt of an outlet valve assembly 30 in communication therewith, as best seen in FIG. 4. Side stiffeners 32, of channel shape construction, are secured at intervals along the length of each side wall 22 in opposing relationship to a corresponding stiffener 32 on the facing side wall 22. Side stiffener closure members 34 are provided to secure corresponding stiffeners 32 on opposite sides of the car together below the plates 24 and 26.

Horizontal side stiffener members 36, in the form of T-beams having a vertical leg 38 and a horizontal leg 40, are secured to the upper edges of the side stiffeners 32 associated with each side wall 22 and to the side wall itself adjacent the upper edges thereof, as best seen in FIGS. 3 and 4. Tubular tie members 42 extend across the hopper sections 18 and through openings in the side walls 22, as best seen in FIGS. 2 and 6. The ends of the tie members 42 are slotted to receive the horizontal leg 40 of the corresponding stiffener member 36 therein and permit the outer edges to be secured to the corresponding vertical leg 38 of the stiffener member 36.

The cone sections 20 are fabricated from end shell sheets 44, intermediate shell sheets 46, and center shell sheets 48, as best seen in FIG. 1. The sheets 44, 46 and 48 are so shaped that when secured together end to end they form a pair of asymmetric truncated cones. The lower edges of the sections 20 are positioned inside and slightly below the upper edges of the side walls 22, as seen in FIG. 6. The lower edges of the sections 20 are welded to the inner surface of the corresponding sections 18 and the upper edges of the sections 18 are welded to the corresponding sections 20. Side flashings 49 are secured along their upper edges to the cone sections 20 and along their lower edges to the upper edges of vertical legs 38, as best seen in FIGS. 5 and 6. Suitable openings are provided at the top of sections 20 for receipt of manway covers 50.

End sheets 52 are secured to the inside surfaces of the body 12 a short distance inside the respective ends, as best seen in FIGS. 1 and 3. End stiffeners 56, of channel shape construction, are vertically spaced apart and secured to the outside surfaces of the end sheets 52 and to the inner surfaces of the body 12.

Supporting car body 12 above the wheel trucks 16 are bolster/shear plate/draft sill assemblies 14, as best seen in FIGS. 1-3 and 5. The unusual geometry of the car body 12 necessitated a fresh approach towards the design of the bolster assembly 14. A single vertical shear plate 60, which increases in height as it extends outward, is provided to fill the considerable space between the bottom of the body 12 and the trucks 16 and to transmit longitudinal train loads into the car body 12. Bolster assembly 14 additionally includes bolster side stiffeners 62, bolster pipes 64, bolster stiffeners 66, bolster beams 68, and a conventional stub draft sill 70. Bolster side stiffeners 62 are secured to the hopper sections 18 and the stiffener members 36 in a similar manner as the side stiffeners 32, as best seen in FIG. 5. The lower edges of stiffeners 62 are secured to the shear plate 60 and to a plate 72 associated with the draft sill 70. The bolster beams 68 are secured to and extend transversely outward from either side of the draft sill 70 directly below the stiffeners 62. The bolster pipes 64 are secured at their lower ends to the corresponding beam 68 and extend upward and inward for attachment to the upper end of the corresponding stiffener 62. Wedge shape bolster stiffeners 66 are secured in place at the intersections between the bolster side stiffeners 62 and the bolsters beams 68. End support plates 76 are secured at their lower ends to the stub sill 70 and at their upper ends to a bottom portion of the side wall 22, as best seen in FIG. 3. A pair of support plates 76 are provided at each end of the car, one associated with each side of the car.

Referring to FIG. 4, the outlet valve assembly 30 is designed to permit unloading through a single valve assembly either vertically or horizontally to either side. Assembly 30 includes a twelve inch outlet pipe 80 in communication at its upper end with the interior of body 12 through opening 27 in transition plate 26. Extending transversely outward from a center portion of pipe 80 are a pair of four inch discharge pipes 84 and 86, one towards each side of the car. Associated with the respective discharge pipes 84 and 86 are a control valve 88 and a suitable fitting 90 for connecting same to a commodity receiving line. A control valve 82 (not specifically shown) is mounted horizontally within pipe 80 below the discharge pipes 84 sand 86. Further, provided through the top of body 12 are a suitable vacuum relief valve 94 and a safety relief valve 96.

The tank car structure disclosed hereinabove was specifically designed to receive a unique aeration assembly 100, a disclosure of which immediately follows hereinbelow. Referring to FIGS. 1 and 7-13, aeration assembly 100 is positioned within body 12 a short distance above the bottom of hopper sections 18 so as to define a plenum area 102 therebelow. Aeration assembly 100 includes a center aeration conveyor tray 104, a pair of intermediate aeration conveyor trays 106, and a pair of end aeration conveyor trays 108 which are respectively supported on center tray supports 110, intermediate supports 112, and end tray supports 114. Tray supports 110, 112 and 114 consist of longitudinally extending angle iron members secured to the side walls 22, as best shown in FIGS. 10 and 11. Aeration trays 104, 106 and 108 respectively include upper fluidizing conveyor surfaces 116, 118 and 120; side sealing surfaces 122, and 124 and 126 which angle downward and inward from the edges of the conveyor surfaces; and bottom support surfaces 128, 130 and 132 which extend inward from the lower edges of the sealing surfaces. The outer ends of trays 108 are closed off by an end wall 134. The center aeration tray 104 is wider at its center than at its ends and slopes downward from its ends toward the center. An outlet opening 136, centrally formed through tray 104, is defined by a cylindrical side wall surface 138 and a circular bottom surface 140. An aluminum grating 141 is fitted within the trays 104, 106 and 108 to permit workmen to walk down the sloping conveyors.

In assembling aeration assembly 100 within the body 12, the aeration trays 104, 106 and 108 are lowered into place for support on the respective tray supports 110, 112 and 114. A longitudinal neoprene gasket 142 is sandwiched between the side walls 22 and the sealing surfaces 122, 124 and 126 and between the support surfaces 128, 130 and 132 and the corresponding tray supports 110, 112 and 114. The outer ends of trays 108 are supported on a bracket 144 secured to plate 24 and end sheet 52, as best seen in FIG. 13. A neoprene gasket 146 is positioned between the tray 108 and bracket 144. The trays 104, 106 and 108 are secured in place by a plurality of threaded locking members 148 secured to the supports 110, 112 and 114 and extending upward through corresponding openings 150 in the trays. Locking nuts 152 hold the trays firmly in place. At the joints between the inner ends of trays 108 and the outer ends of trays 106 and the inner ends of trays 106 and the ends of trays 104 a joining bar 154 extends across each joint sandwiching a neoprene cross gasket 156 between it and the corresponding trays, as best seen in FIGS. 11 and 12. Locking members 148 extend through openings in the bars 154 for receipt of the locking nuts 152 so as to firmly connect the adjacent trays together. Referring to FIG. 10, the outlet opening 136 in tray 104 extends downward toward outlet valve assembly 30. Bottom surface 140 is secured about its periphery to a reinforcing ring 29 defining opening 27 in transition plate 26. A neoprene outlet gasket 158 is sandwiched between ring 29 and bottom surface 140.

The conveyor trays 104, 106 and 108 are fabricated from a porous metal material to permit the passage of fluidizing air therethrough. An example of such a material is "Dynapore Porous Stainless Steel Wire Mesh Specification No. 402,700 (.048 inch thick)." The unique design of the present invention keeps the area of the conveyor trays to a minimum which is quite significant due to the high cost of the material. Further, and equally important, by designing the aeration assembly 100 to be fabricated in a plurality of relatively narrow conveyor trays, the aeration assembly can be disassembled and removed through the manways 50 in the top of the car. Upon removal of these aeration devices, the inside of the car is completely clean and can be washed and steamed. The conveyor trays themselves can be soaked in solvent and sterilized after removal from the car.

Referring to FIGS. 1, 4 and 7, an air supply pipe assembly 160 is provided to supply pressurized air into the plenum area 102 below the aeration assembly 100. In accordance with the preferred embodiment, the plenum area 102 on each side of the outlet opening 136 is divided into two chambers by plenum dividers 162. Assembly 160 includes an inlet pipe 164 having a coupling and check valve assembly 166 at each end. A transfer pipe 165 communicates with inlet pipe 164 at one end and an air distribution pipe 168 at its other end. Air distribution pipe 168 extends longitudinally towards both ends of the car to a point a short distance beyond the plenum dividers 162. Extending downward from pipe 168 and bending under the car body 12 is an air supply pipe 170 associated with each of the plenum area chambers. A control valve 172 is provided in each pipe 170 to control the air flow therethrough. As best seen in FIG. 7, the ends of the air supply pipes 170 communicate with the plenum area 102 through openings in the transition plates 24. The present invention contemplates the removal of the plenum dividers 162 should the pressure difference between the part of the aeration assembly 100 covered with material or uncovered be very low. If separate plenum chambers are not necessary, the air can be supplied directly into the plenum area through the inlet pipe 164 and coupling and check valve assembly 166.

The tank car 10 as disclosed hereinabove is extremely simple to operate. Where the product must be pumped horizontally and vertically into a silo or truck the car is unloading in its pressure discharge mode. The customers product receiving line or lines are connected to either or both of the four inch discharge lines 84 and 86 at the couplings 90. With the outlet control valves 88 and the two inner air supply control valves 172 closed, an air supply line is connected to coupling 166 and the outer air supply control valves 172 are opened to pressurize the car to any pressure up to 30 p.s.i.g. When the car reaches the desired pressure, the inner air supply control valves 172 are partially opened and the outlet control valve or valves 88 are open to discharge the product therethrough until the car empties. To prevent the plugging of the customers product receiving line a boost pipe and valve assembly (not shown) may be provided in communication with the discharge lines 84 and 86. When the product is to be dumped into a recepticle located below the outlet valve assembly 30 the car is unloaded in its gravity discharge mode. With the product receiving recepticle positioned immediately below the twelve inch outlet valve assembly 30, one of the many covers 50 is opened and an air supply line is connected to coupling 166. All four of the control valves 172 and the twelve inch outlet valve (not shown) are then opened to effect the gravity discharge downward into the recepticle. The air entering plenum area 102 passes upward through porous surfaces 116, 118 and 120 into the body 12 so as to fluidize the product above the porous surfaces. The product no longer has a natural angle of repose and instead behaves as a fluid. Since the conveyor trays 104, 106 and 108 slope towards the middle of the car, the product runs down the slope and out of the outlet 30. The steeply sloping side walls 22 ensure that, as the product runs down the slope and out the outlet 30, the product above the layer fluidized continues to fall onto the conveyor trays, becomes fluidized and flows out of the car until eventually the car is empty.

In summary, the hereinabove disclosed tank car 10 was specifically developed with the overriding concerns directed towards its unique operating characteristics. This resulted in the car geometry being completely defined prior to the start of the structural design and stress analysis. In structural action, the car is hybrid: part shell and part plate structure. The conical shell sections 20 forming the upper part of the car body 12, give an economical means of resisting the interior pressures and provide strength for gravity and train loads. The unique cross-sectional shape (resulting from the need for steep hopper side walls 22 and relatively narrow fluidized conveyor trays 104, 106 and 108) made it impossible to carry pressure loads by shell action in the lower part of the car. This problem was solved by utilizing hopper sections 18 which are continuously stiffened around their three sides by stiffeners 32 and 34. The out-of-balance forces at the junction between conical shell sections 20 and hopper plate sections 18 could have been resisted by external stiffening but at unacceptable penalties in weight and cost. Therefore, the discrete interior tie members 42 coupled with the continuous longitudinal side stiffeners 36 were devised as an economical solution. The structural action of this combination is effective to isolate the shell action from the plate action resulting in an optimum overall economy. The geometry of the car body 12 also necessitated a fresh approach towards the design of the bolster/shear plate/draft sill assembly 14. The bottom of the car body 12 at the trucks 16 is considerably above the draft sill 70. This, together with the complexity of the car body geometry, led to the use of a single vertical shear plate 60 to transmit longitudinal loads into the car body 12, and an M-shaped saddle assembly, formed by the pipes 64 and stiffeners 62 and 66, connected to a conventional bolster beam 68 for transmitting the vertical and lateral forces from the car body to the truck or jacking points.

It should be understood, of course, that the foregoing disclosure relates to only a preferred embodiment of the invention and that numerous modifications or alterations may be made therein without departing from the true spirit and the scope of the invention as set forth in the appended claims.

What is claimed is:

1. In a railroad tank car for use in handling dry bulk commodities including a pair of bolster assemblies secured to longitudinally spaced wheel truck assemblies for supporting the car, an improved car body structure mounted on and secured to said bolster assemblies, comprising:

a. a pair of V-shaped hopper sections sloping downwardly from each end of the car to meet at the center of the car, said hopper sections having side walls which increase in length as they extend towards the center of the car;
 b. a pair of asymmetric truncated cone sections secured adjacent to the corresponding upper edges of each of said hopper sections and to each other at the center of the car, said cone sections having an increasing diameter as they extend toward the center of the car;
 c. a pair of end sections secured adjacent the outer edges of said hopper section and said cone section;
 d. a plurality of substantially vertical longitudinally spaced apart first stiffener members secured to the outer surfaces of said hopper section side walls;
 e. longitudinally extending second stiffener members secured to said first stiffener members adjacent the intersection between said hopper sections and said cone sections; and
 f. a plurality of substantially horizontal longitudinally spaced tie members which extend transversely across said hopper section and pass through said side walls for attachment at their respective ends to said second stiffener members.

2. The invention as defined in claim 1 wherein said hopper sections are formed from side plate members which extend downward and inward toward one another, said plate members being secured together at their lower edges by longitudinally extending transition plates.

3. The invention as defined in claim 2 wherein an outlet opening is centrally formed through one of said transition plates for receipt of an outlet valve assembly in communication therewith.

4. The invention as defined in claim 2 wherein third stiffener members are provided for securing together corresponding first stiffener members on opposite sides of the car body below said transition plates.

5. The invention as defined in claim 2 wherein each of said bolster assemblies include: a vertical shear plate secured along its upper edge to said transition plate; a stub draft sill assembly mounted above said wheel truck assembly and secured to the lower edge of said vertical shear plate; a pair of bolster side stiffener members secured in a facing relationship one on each side of said hopper section and to said shear plate and said draft sill assembly at their lower ends; a pair of bolster beams extending transversely outward from each side of said draft sill below said side stiffener members; and bolster pipes secured at their lower ends to said bolster beams and extending upward and inward for attachment to the upper ends of said side stiffener members.

6. The invention as defined in claim 1 wherein said second stiffener members are T-beams having vertical legs spaced from said hopper sections and horizontal legs secured along there undersurface to the upper edges of said first stiffener members.

7. The invention as defined in claim 6 wherein the ends of said tie members are slotted for receipt of said horizontal legs of the corresponding second stiffener members.

8. The invention as defined in claim 1 wherein said end sections are secured to said hopper sections and said cone sections a short distance inside the outer edges thereof and a plurality of end stiffener members are secured to the outer surfaces of said end sections and to the inner surfaces of said hopper sections and said cone sections.

* * * * *